United States Patent [19]
Bauer et al.

[11] Patent Number: 4,472,854
[45] Date of Patent: Sep. 25, 1984

[54] WINDSHIELD WIPER INSTALLATION

[75] Inventors: Kurt Bauer, Ingersheim; Herbert Bienert, Besigheim; Hans Prohaska, Bietigheim-Bissingen; Eckhardt Schmid, Brackenheim, all of Fed. Rep. of Germany

[73] Assignee: ITT Industries, Inc., New York, N.Y.

[21] Appl. No.: 387,756

[22] Filed: Jun. 14, 1982

[30] Foreign Application Priority Data

Jun. 16, 1981 [DE] Fed. Rep. of Germany ....... 3123859

[51] Int. Cl.³ .............................................. B60S 1/34
[52] U.S. Cl. ............................... 15/250.2; 15/250.17; 15/250.34
[58] Field of Search ............. 15/250.2, 250.31, 250.34, 15/250.35, 250.19, 250.21, 250.16, 250.17

[56] References Cited

U.S. PATENT DOCUMENTS

| 2,844,839 | 7/1958 | Krohm | 15/250.35 |
| 3,604,048 | 9/1971 | Mainka | 15/250.26 |
| 4,370,774 | 2/1983 | Bienert et al. | 15/250.2 |

FOREIGN PATENT DOCUMENTS

| 2727454 | 12/1978 | Fed. Rep. of Germany ... 15/250.34 |
| 1021131 | 2/1966 | United Kingdom ............. 15/250.34 |

Primary Examiner—Peter Feldman
Attorney, Agent, or Firm—Donald J. Lenkszus

[57] ABSTRACT

In a windshield wiper assembly, the contact pressure of the wiper blades against the windshield is varied by displacing the wiper shaft in a direction along the axis of the shaft.

50 Claims, 7 Drawing Figures

WINDSHIELD WIPER INSTALLATION

BACKGROUND OF THE INVENTION

This invention pertains to a windshield wiper installation, especially for motor vehicles.

When vehicle speed is high the air impinging upon the windshield streams away from the windshield upwards and to both sides under such a high pressure that it creates an ascending force at the wiper blades and wiper arms. Thus, the contact between the windshield and the wiper blade is diminished so that the cleaning effect of the windshield wiper installation is reduced. The problem is especially pronounced in considerably curved lateral areas of the windshield. For the safety of all road users, it is however, necessary that the windshield is cleaned properly also at high speeds.

To reduce the tendency of the wiper blades to lift from the windscreen or avoid it completely, various designs of windshield wiper installations are known. In some of these installations spoilers or other aerodynamic surfaces are attached on the wiper blades and/or wiper arms to produce an additional pressure which is effective against the ascending force. In contrast thereto another windshield wiper installation, described in German specification OS No. 2,824,014, is designed in such a way that by manipulations of the wiper arm spring various contact pressure values can be provided even while the vehicle is moving and when the wipers are operating. Such a windshield wiper installation is not only suitable for providing a higher contact pressure at high vehicle speeds than at lower vehicle speeds, but also for reducing the contact pressure when the wipers are not operating and the wiper blades occupy the parking position. By this measure the pressure is removed from the wiper rubber, so that wear is reduced.

In the windshield wiper installation of German specification OS No. 2,824,014 the main parts of the wiper arm are a wiper arm head, a swivelling member and a wiper arm spring which is suspended on the first mentioned parts. The swiveling member is normally composed of a link and a wiper rod. The wiper arm head includes a fastening member which is mounted on the wiper shaft in a manner protected against twisting and a holding member on which the wiper arm spring acts. The holding member is developed as a two-armed lever which is tiltably mounted on the fastening member and which can be displaced relative to the fastening member of the wiper arm head by means of a rod which extends in the hollow wiper shaft. An imagiary line may be drawn between the suspension point of the wiper arm spring on the swiveling member and on the holding member. The distance of this imaginary line from the articulated axle between the fastening member and the swiveling member is changed by such a displacement so that the lever arm producing the contact pressure and thus, the contact pressure itself becomes greater or smaller. One disadvantage of that windshield wiper installation is than an additional rod is necessary for changing the relative position between the fastening member and the holding member of the wiper arm head and further that the wiper shaft has to be hollow.

SUMMARY OF THE INVENTION

It is an object of the invention to provide a windshield wiper installation which does not comprise additional parts which have to be conducted from the vehicle interior through the body to the outside. This is to be effected in such a way that both the parts of the windshield wiper installation positioned outside and the parts positioned inside are made as simple as possible and can easily be mounted.

This problem is solved according to the invention in that the wiper shaft with the fastening member of the wiper arm head may be displaced relative to the wiper bearing in the axial direction and that the holding member of the wiper arm head is supported on the wiper bearing.

Thus, in a windshield wiper installation according to the invention the wiper shaft is used as a part conducted from the inside to the outside. The fastening member of the wiper arm head is displaced relative to the wiper bearing together with the wiper shaft, because the holding member of the wiper arm head is supported on the wiper bearning. The position between the fastening member and the holding member of the wiper arm head and thus the position between the articulated axle, between the wiper arm head and the swiveling member of the wiper arm, and the suspension point of the wiper arm spring on the holding member is changed by the modified position of the fastening member relative to the wiper bearing. Thus in order to vary the contact pressure the effective lever arm can be varied. The wiper arm spring may be tensioned, more or less, so that the force component which produces the contact pressure becomes greater or smaller.

In one embodiment of the invention, two guide elements are provided which may be twisted relative to each other by the bearing crank of the wiper shaft. One of these two elements is coupled with the wiper shaft in the axial direction, whereas the other is secured such that it cannot be displaced in the axial direction. By twisting against each other, the two guide elements are displaced relative to each other in the axial direction, so that the position of the wiper shaft is changed relative to the axially stationary guide element. A conversion of the rotary movement into an axial displacement can, for example, also be achieved in that the two guide elements are coupled with each other in a similar way as a screw and a nut.

In accordance with the invention one sided loading of the wiper shaft and the support is avoided. The guide element which may be displaced is arranged on the support and is formed by the wiper bearing surrounding the wiper shaft. So for instance, the front side of the wiper bearing facing the bearing crank can be provided with several guide cams against each of which rests a guide stud. Such a development is comparable to a multiple thread.

The guide elements, which in the axial direction are coupled with the wiper shaft, may be arranged on the bearing crank in a manner protected against twisting. With this arrangement, during a wiping cycle the wiper shaft will be displaced from a neutral position and at the end of the wiping cycle will reach the neutral position again. In this manner different contact pressures may be provided in different places of the windshield. This would, however, result in greater wear of the windshield wiper installation.

In a more advantageous embodiment, each guide element to be twisted with the bearing crank is provided on a separate support. The coupling between the support and the bearing crank may be disengaged and the wiper shaft may be secured in the various positions. When a windshield wiper installation is developed in such a way, the guide elements which may be twisted can at least partly be at rest. During this time the contact pressure remains constant. It cannot be changed by chance through vibrations because the wiper shaft is secured in the various positions by various locking elements that are lockable with each other.

Further in accordance with the invention, the bearing crank and the support are coupled with a dead travel and are detached from each other as long as the dead travel is effective. In such a design the bearing crank can take along the support only within particular areas of the wiping angle over which the wiper arm can move. Thus, a change of the contact pressure is possible within these areas.

In a windshield wiper installation, in which the wiper arm is swivelable into a parking position which lies outside the normal wiping angle, the coupling with a dead travel is used to bring the contact pressure from a low parking value to a higher operating value upon setting into operation the windshield wiper installation. The parking value is reached again when the wiper arm returns into the parking position.

The bearing crank and the support are advantageously coupled with each other through catches. These catches are preferably arranged on the support. It is however, possible to arrange them on the bearing crank.

If it is desired that the contact pressure value in the parking position of the wiper blade is lower than when the windshield wiper installation is operated, the support may be provided with a catch which always retains its position relative to the support and upon which the bearing crank acts with the first swivel from the parking position. A secondary catch can be moved into the path and out of the path of the bearing crank.

To avoid irregular control actions the bearing crank may be coupled with movable catches only in the one direction and with other movable catches only in the other direction. Thus, it is ensured that the support is adjusted in accordance with the desired increase or reduction of the contact pressure. This type of coupling can be achieved by providing the catches and/or the bearing crank with bevels by means of which the catches can be pushed back. When the bevels are provided on the bearing crank, they and the two groups of catches will be arranged on different radii.

In accordance with an embodiment of the invention, the movable catches are displaced by electromagnets, of which certain ones are excited with a positive change in the vehicle speed and the other ones with a negative change in the vehicle speed. The latter can be designated as release electromagnets, the former as operating electromagnets.

The electromagnets may be energized for only a short time by inserting timing elements in the control leads. The pulses applied to the timing elements have to be of long enough duration that a change-over of the support is reliably effected. If it is desired only to excite the electromagnets for a time as short as possible, it is more advantageous that normally closed contacts are assigned to the electromagnets such that each normally closed contact interrupts the circuit of a selected electromagnet which effects the displacement and that upon a further displacement the contact is closed again. When the bearing crank has acted upon the catch the normally closed contact can immediately interrupt the circuit, because the bearing crank and the catch rest so firmly against each other that the catch is only removed, when the bearing crank changes its direction of motion.

Further in accordance with the invention, the electromagnets are only excited in particular swiveling ranges of the bearing crank. Therefore, no bevels are necessary on the catches or on the bearing crank.

In order to ensure that in the parking position and when the windshield wiper installation is switched off the wiper rubber is loaded as little as possible, it is appropriate that the lowest contact pressure may be adjusted when the operating switch is moved into the off-position. This is reliably achieved by carrying out at least one more wiping cycle after the installation has been switched off.

The holding member is substantially independent of the fastening member because an axial displacement of the wiper shaft with the fastening member does not affect the position of the holding member relative to the wiper bearing in any way. The fastening member and the holding member are coupled with each other through catches in a manner protected against twisting, but axially displaceable relative to each other. To simplify the assembly, the holding pin, on which the wiper arm spring is suspended on the holding member, projects into an oblong hole of the fastening member. In this manner the holding member is secured on the fastening member before the wiper arm is mounted onto the wiper shaft and the wiper arm can be mounted as a whole.

In a further embodiment, the holding member is secured in a form-fit manner in the axial direction. The holding member may be supported on the fastening member by means of a spring.

In an embodiment of the invention a change of contact pressure by a particular value can be obtained with only a small axial stroke of the wiper shaft. On the fastening member of the wiper arm head a lever is swivelably mounted whose position defines the position of the suspension point of the wiper arm spring. The lever is coupled with a guide surrounding the wiper shaft and the position of this guide relative to the fastening member is variable in the axial direction. Thus, when the fastening member is displaced the articulated axle of the lever is moved simultaneously. The guide remains fixed in the axial direction. This results in a change of the position of the lever on the fastening member. In this manner the axial stroke of the wiper shaft can be transformd in a larger stroke of the suspension point of the wiper arm spring relative to the articulated axle between the swiveling member and the fastening member.

When a lever articulated on the fastening member is used as a holding member, the wiper arm spring is differently tensioned in the various positions corresponding to a particular contact pressure. Thus, the force exerted by the spring in the various positions is modified. This change in the force can be positively or negatively superimposed by the change of the lever arm. For the force to be positively superimposed, the lever or the levers are to be arranged in a very specific way. As a result the wiper arm head is relatively large. In advantageous arrangements of the levers the change of the spring force reduces the effect of the change of the lever arm. The length of the spring should be kept as small as possible. This can be achieved by selecting a relatively large spacing between the bearing axle of the lever forming the holding member and the suspension point of the wiper arm spring on it. In an embodiment, the suspension point of the wiper arm spring is closer to the wiper shaft than the bearing axle of the lever which is arranged on extensions of the wiper arm head projecting into the swiveling member.

A greater spacing between the bearing axle and the suspension point is thus obtained, but when the holding member is directly coupled with the guide the axial stroke of the wiper shaft can only be transmitted with difficulties. However, this disadvantage is cured in that the lever forming the holding member is supported by the lever coupled with the guide. Thus, there are now two levers. By the one lever the axial stroke of the wiper shaft can be transmitted. The other only causes small changes of the spring length. The holding member is always loaded by the wiper arm spring in the same direction of rotation.

Advantageously, the lever forming the holding member is built up, fork-shaped and each wing of the fork is separately mounted. In this case the bearing axle can be located within the length of the wiper arm spring.

BRIEF DESCRIPTION OF THE DRAWINGS

The invention may be better understood from a reading of the following detailed description in conjunction with the drawings in which.

DETAILED DESCRIPTION

Figure 1:
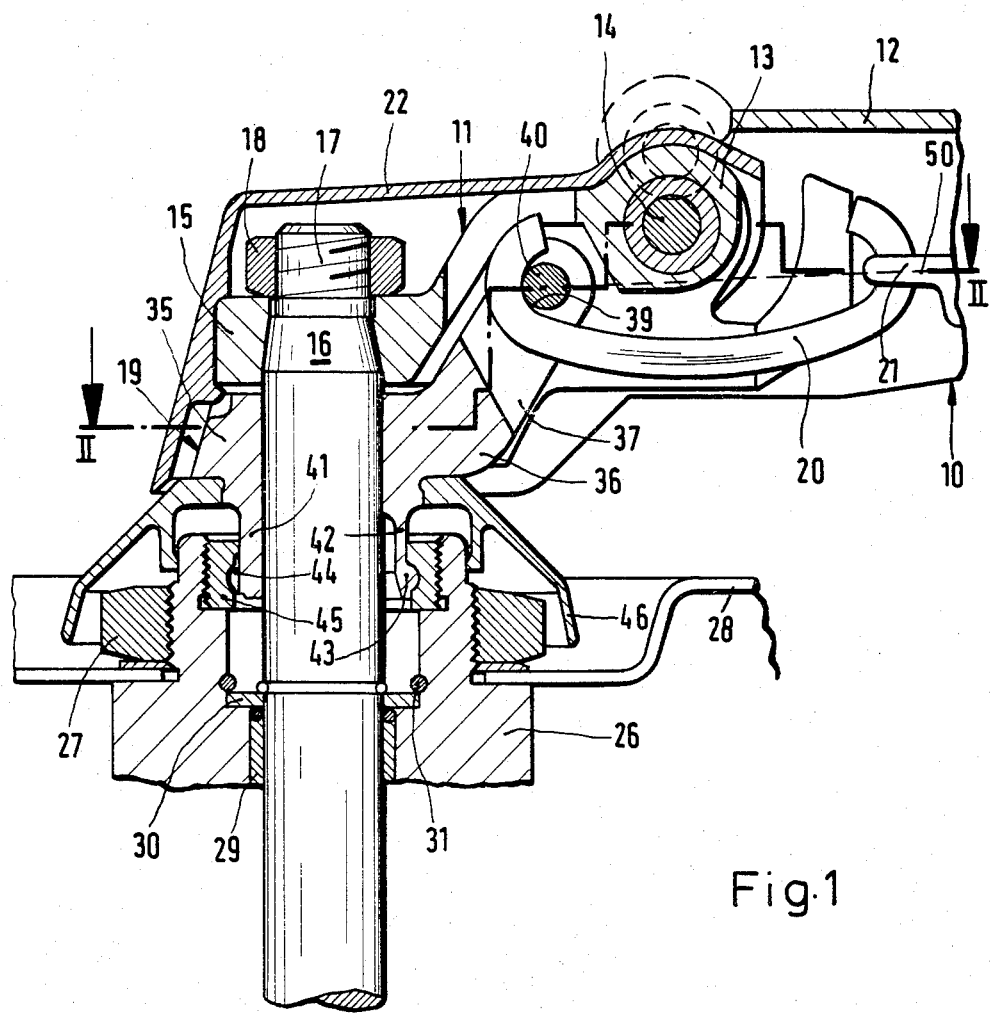
FIG. 1 is a first embodiment in which the holding member is secured onto the wiper bearng in a form-fit manner.

The wiper arms 10 of FIGS. 1 to 4 include a head 11 and a swiveling member 12 which is pivoted with the head through the pivot pin 14 seated in a bearing bush 13 of the head 11. The wiper arm head 11 includes a fastening member 15, which in a manner protected against twisting is slipped on a portion 16 of the wiper shaft 17 and secured on the wiper shaft by the screw nut 18. The wiper head 11 includes the bearing bush 13. A holding member 19 supports one end of the wiper arm spring 21 via the C-yoke 20. Although not shown, the other end of wiper arm spring 21 engages on the swiveling member 12. Between the fastening member 15 and the swiveling member 12 a cap 22 is mounted on the bearing bush 13. Cap 22 covers the wiper arm head and protects it against dirt.

Figure 2:
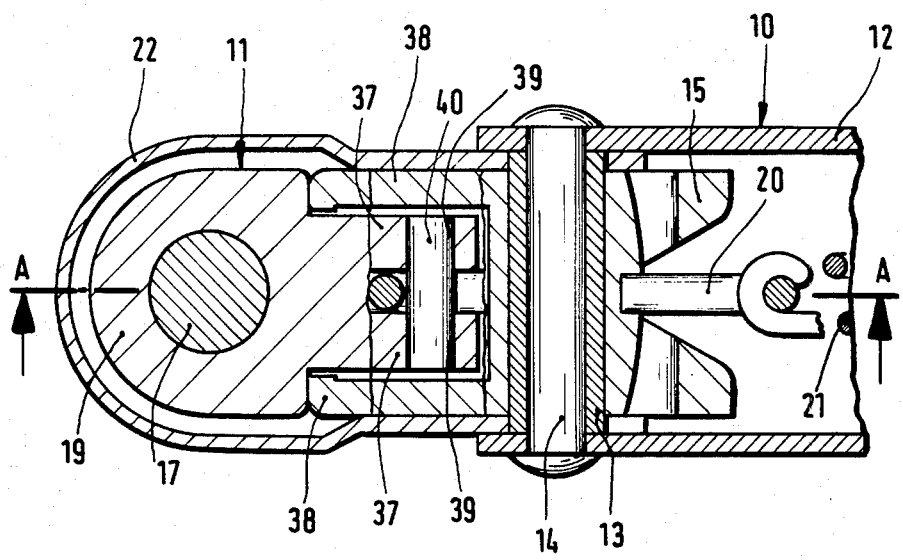
FIG. 2 is a section taken on the line II—II of FIG. 1.

In the embodiment of FIGS. 1 and 2 the wiper shaft 17 is rotatably mounted in wiper bearing 26 which can be secured to the body 28 of a motor vehicle by a nut 27. To support the wiper shaft 17 a bearing bush 29 is inserted in the wiper bearing 26. Bearing bush 29 is secured in the axial direction by the disk 30 and the circular clip 31.

The holding member 19 is substantially composed of three sections. A ring section 35 may be regarded as a first section. Ring 35 surrounds the wiper shaft 17 and is located below the fastening member 15. In the direction towards the wiper arm spring 21 a forked stud 36 is formed on the ring 35. Stud 36 diagonally projects in the upward direction with the two parallel wings 37. The stud 36 is flanked on each side by a check 38 of the fastening member 15. Each wing 37 has a bore 39 which is flush with the bore of the other wing. In the bore 39 a holding pin 40 is inserted which is secured by the cheeks 38 of the fastening member. Holding pin 40 is encompassed by the C-yoke 20 which projects into the interspace between the two wings 37. In the direction towards the wiper bearing 26 the ring 35 is elongated by a sleeve 41 which forms the third section of the holding member 19 and surrounds the wiper shaft 17. Springs 42 are created by longitudinal slots on the sleeve 41. Springs 42 engage by means of detents 43 into an internal annular groove 44 of bearing bush 45. Bearing bush 45 is screwed into the wiper bearing 26 and secured by force-fitting. The sleeve 41, the bearing bush 45 and the nut 27 are covered by a protective cap 46.

Because the holding member 19 is locked with the bearing bush 45 it is not movable relative to the wiper bearing 26 in the axial direction. In the direction of rotation the holding member 19 is carried by the cheeks 38 of the fastening member 15 via the stud 36. The holding member 19 is supported on the wiper shaft 17, but is not coupled in a manner protected against twisting. This provides the advantage that the holding member 19 in its relative position is fully adaptable to the position of the fastening member 15.

In the wiper arm described the torque exerted on the swiveling member 12 by the wiper arm spring 21 is determined by the force of the wiper arm spring and the effective lever arm which corresponds to the spacing the axis of the pivot pin 14 has from a plane 50 which is defined by the holding pin 40 and the suspension point of the wiper arm spring 21 on the swiveling member 12. This plane 50 is shown by a broken line in FIGS. 1, 3 and 4. Thus with the arrangement of pivot pin 14, holding pin 40 and suspension point of the wiper arm spring 21 on the swiveling member 12 of FIG. 1 a given contact pressure is created. When now the wiper shaft 17 is displaced to the outside the fastening member 15 moves carrying with it the pivot pin 14. Eventually the fastening member 15 with the pivot pin occupy the position indicated by broken lines above the pivot pin. The holding member 19 has not changed its axial position. Thus the spacing between the axis of the pivot pin 14 and the plane 50 and consequently the effective wiper arm have become greater, so that now a greater contact pressure is created. Thus it is possible to change the contact pressure in dependence on the axial position of the wiper shaft 17 and of the fastening member 15. It is also possible to provide several axial positions separated from one another by spacings. But a continuous adjustment is also possible.

Figure 3:
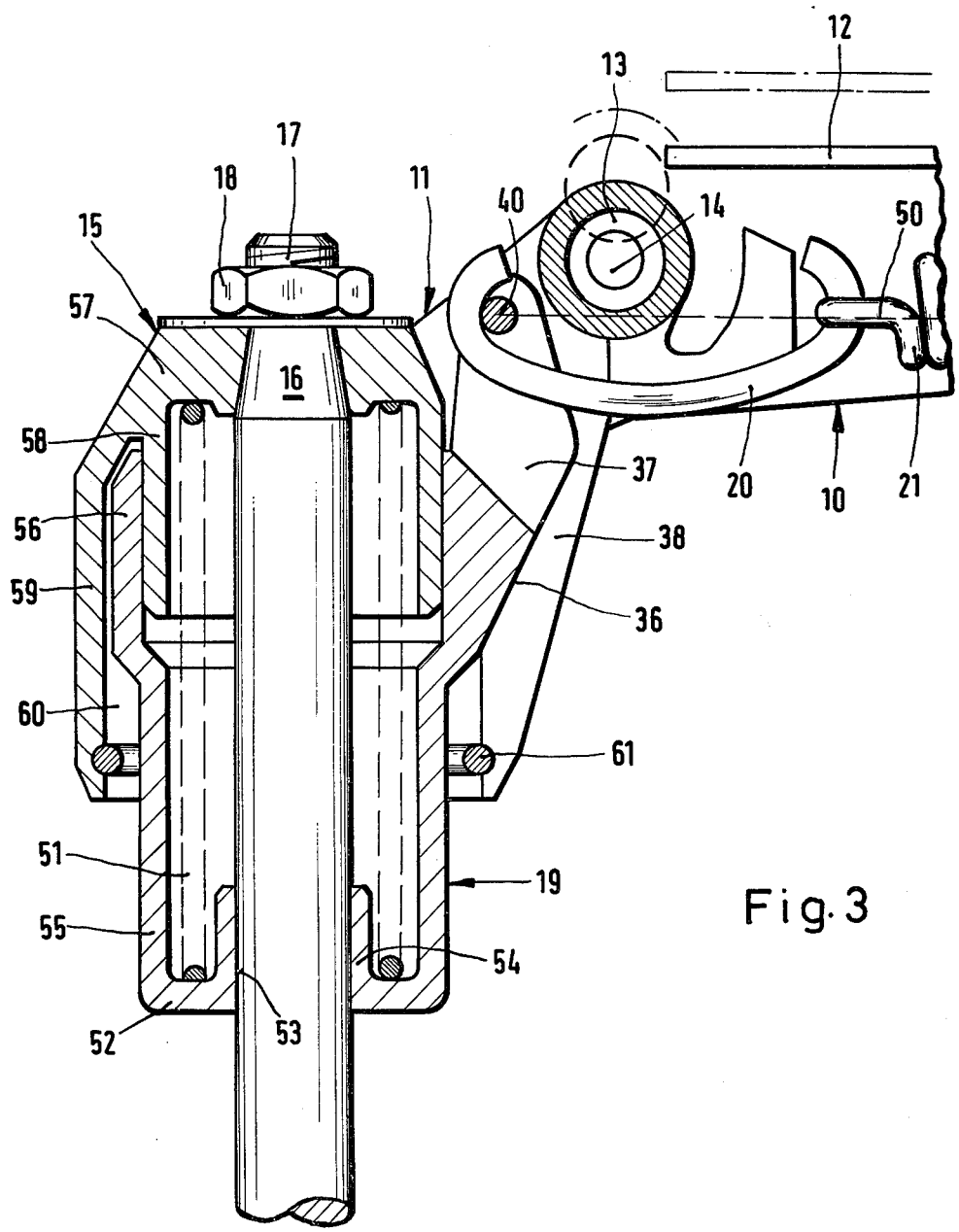
FIG. 3 is an embodiment similar to that of FIGS. 1 and 2 in which the holding member is supported on the fastening member by means of a pressure spring.

In contrast to the embodiment of FIGS. 1 and 2 in which the holding member 19 is in the axial direction secured in a form-fit manner, the holding member 19 of the version according to FIG. 3 is supported on the fastening member 15 by means of a helical spring 51 subjected to pressure. The holding member 19 is cup-shaped, has a bottom 52 with an opening 53 for the wiper shaft 17 and a hollow-cylindrical stud 54 projecting from the bottom into the interior of the cup and surrounding the wiper shaft. The jacket of the cup is composed of two sections 55 and 56 which in the axial direction are arranged one behind the other and of which the upper section 56 is shouldered to the outside so that section 56 has a larger inside and outside diameter. In the direction towards the wiper arm spring 21, a stud 36 with the two wings 37 and the holding pin 40 is formed on the section 56 in a similar way as in the example of FIGS. 1 and 2. The disk-shaped section 56 of the fastening member 15 is secured on the cone 16 of the wiper shaft and its underside is provided with a hollow cylinder 58 which projects into the holding member 19 and is surrounded by the section 56 of the holding member. The outside diameter of the hollow cylinder 58 corresponds to the inside diameter of the section 56 and the inside diameter of the hollow cylinder 58 corresponds to the inside diameter of the section 55 of the holding member 19. Thus the latter and the fastening member 15 are guided in each other. The helical spring 51 is positioned inside the hollow space formed by the sections 55, 56 and 58 of the parts 15 and 19 and is supported on the bottom 52 of the holding member 19 and on the disk 57 of the fastening member 15.

A further hollow cylinder 59 is formed on the fastening member 15 concentrically to the hollow cylinder 58. In the axial direction the hollow cylinder 59 surrounds the section 56 of the holding member 19 entirely and the section 55 partly. Between the portion 55 and the hollow cylinder 59 is a ring-shaped interspace 60. A circular clip 61 which is inserted in an inside groove of the hollow cylinder 59 is positioned in this interspace. Thus the holding member 19 and the fastening member 15 are captively secured on each other. In the one direction the section 56 of the holding member 19 is limited by the disk 57 of the fastening member and in the other direction by the circular clip 61. The stud 36 of the holding member 19 penetrates a slot of the hollow cylinder 59 facing the wiper arm spring and is also flanked by two cheeks 38 which extend as far as to the lower end of the hollow cylinder 59.

The contact pressure can now be modified in the same manner as in the example of FIGS. 1 and 2 by displacing the wiper shaft 17 with the fastening member 15 to the outside or to the inside. FIG. 3 shows the arrangement with the lowest contact pressure. When now the wiper shaft 17 is displaced outwards, the fastening member 15 is taken along. But the holding member 19 retains its position due to the pressure spring 51. Thus the spacing between the axis of the pivot pin 14 and the plane 50 is modified again, so that the contact pressure increases.

In the embodiments accordng to FIGS. 1 to 3 the length of the spring is only slightly modified, when the contact pressure is varied. However, the axial stroke of the wiper shaft has to be approximately just as great as the distance by which the lever arm is to be elongated. In order to provide that only a smaller axially stroke of the wiper shaft 17 is necessary the example of FIG. 4 includes a lever system.

The lever forming the holding member 19 is swivelably mounted on two wings 70 of the fastening member 15 which wings extend from the vicinity of the pivot pin 14 far into the direction towards the wiper arm spring 21. The lever 19 consists of two wings 71. Each wing 71 is separately mounted on the corresponding wing of the fastening member 15 and extends in the direction towards the wiper shaft 17. The free ends of the two wings 71 of the lever 19 are interconnected by a web 40 which forms the holding pin for the C-yoke 20. Due to the separate support of each wing 71 of the lever 19 its bearing axle in the longitudinal direction of the wiper arm 10 can be positioned within the wiper arm spring 21. This enables a great length of the lever 19, so that the length of the wiper arm spring 21 is only slightly modified, when this lever is swiveled.

Because the bearing axle of the lever 19 is positioned above a straight line defined by the suspension point of the C-yoke 20 on the web 40 and the suspension point of the wiper arm spring 21 on the swiveling member 12 the wiper arm spring attempts to rotate the lever 19 in counterclockwise direction. This is prevented by a second lever 72 which supports the lever 19 below the web 40. As seen fron the bearing axle of the lever 19 this second lever 72 is mounted on that end of the fastening member 15 which is positioned beyond the wiper shaft 17 and encompasses the wiper shaft 17 with two arms 73 extending in the same direction. The front ends of the two arms 73 are interconnected by a cross-piece 74 on which the lever 19 is supported. At approximately half the distance between the bearing and the cross-piece 74, a cam 75 is formed on each arm 73 in the downward direction. Each cam 75 is supported on a guide 76 developed as a plane plate. This guide 76 is simultaneously part of a ball bearing 77 acting as a thrust bearing which is protected by a hollow cylinder 78 produced in one piece with the guide 76. When the windshield wiper installation is operated, the guide 76 can also rotate, so that there is no relative movement in the direction of rotation between the guide and the cams 75.

The position of the guide 76 relative to the fastening member 15 is variable by pushing the latter in outside direction with the wiper shaft. Thereby also the bearing of the lever 72 is simultaneously moved. Thus, lever 72 can be swiveled in the clockwise direction, so that the wiper arm spring can swivel the lever 19 in counterclockwise direction. Thus, the effective lever arm and also the contact pressure becomes greater. The value by which the lever arm is elongated is thereby approximately twice as great as the axial stroke of the wiper shaft 17, because the cams are positioned only at approximately half the distance of the lever 72 from the bearing as the web 74. Thus, the movement of the wiper shaft 17 is transmitted, so that only a relativey small axial stroke is necessary for a particular change in the contact pressure.

The wiper shaft 17 is driven by a bearing crank 85 which is connected with a motor. Above the bearing crank 85 a support 86 is rotatably mounted on the wiper shaft 17. Support 86 on its side not facing the bearing crank 85 has two guide studs 87 extending in the axial direction which are arranged diametrically opposite each other. Each of these two studs 87 cooperates with a guide cam 88 assigned to it, which guide cam is developed from the lower front side of the wiper bearing 26 surrounding the wiper shaft 17. The two guide cams 88 have the same shape and are substantially developed to ascend diagonally. The beginning, the end and the middle of each guide cam 88 is provided with locking recesses 89 for the guide studs 87.

Figure 4:
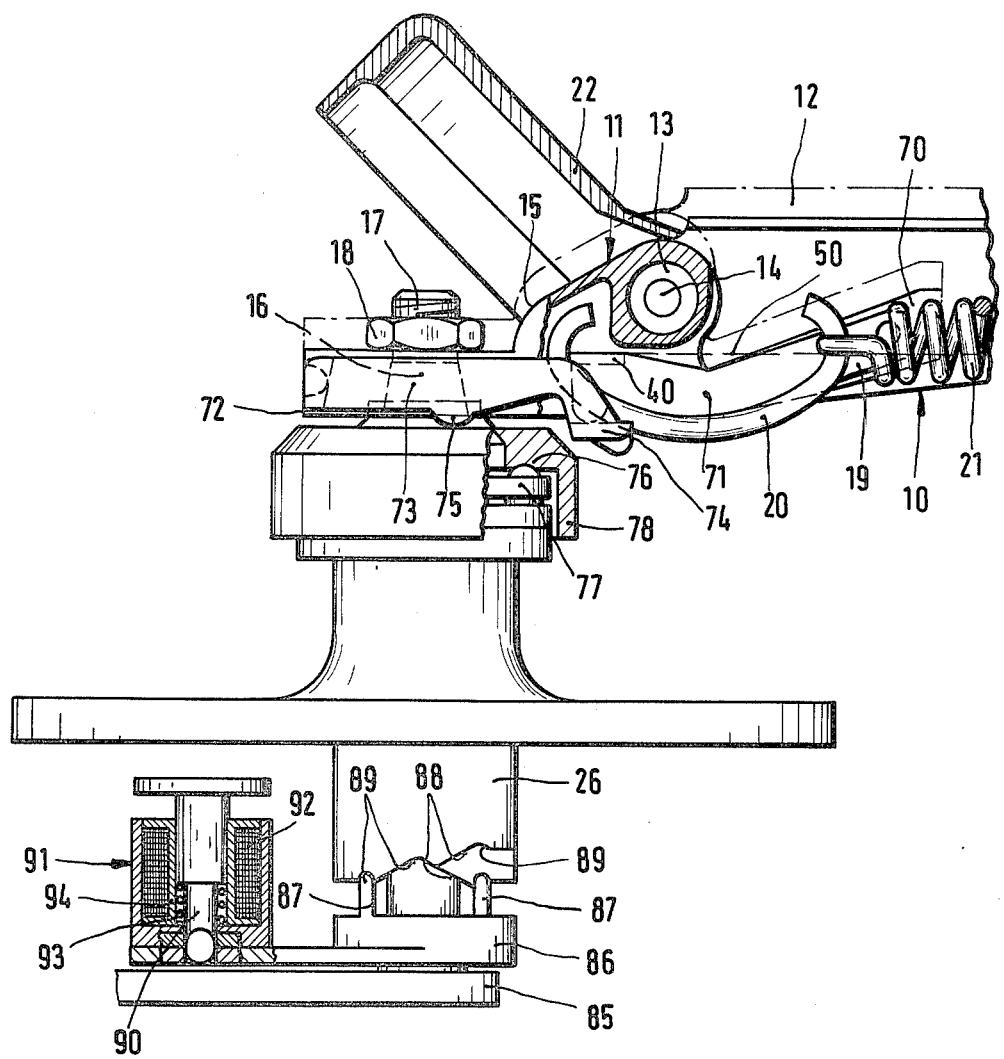
FIG. 4 is a third embodiment in which the holding member is realized by a lever articulated on the fastening member and a support with guide elements may be coupled with the bearing crank.

The support 86 may be displaced by the bearing crank 85. For this purpose the bearing crank can be coupled with the support 86 through catches arranged on the support. FIG. 4 shows a movable catch 90 as the core of an electromagnet 91 with the coil 92. When the coil 92 is disconnected from its voltage source the catch 90 is held outside of the path of the bearing crank 85 by the pressure spring 93 which is arranged between itself and the bobbin 94. When the coil 92 is energized the catch 90 is drawn into the interior of the coil and with its front end gets into the path of the bearing crank 85.

In the windshield wiper installation according to FIG. 4 a total of three different contact pressures is possible. In the position shown in the drawing the lowest contact pressure is adjusted. When the support 86 is then twisted, the guide studs 87 can get into the middle locking recesses 89 of the guide cams 88. Due to the effect of the wiper arm spring 21 the support 86, the bearing crank 85, the wiper shaft 17 and the fastening member 15 are thereby displaced towards the outside, for the wiper arm spring 21 can be slightly shortened by such a displacement. When the support 86 is twisted further the guide studs 87 can get from the middle locking recess 89 also into the upper locking recess 89 of the guide cams 88. When the contact pressure is to be lowered the support is twisted the other way round and all parts which previously were displaced to the outside are drawn back against the force of the wiper arm spring 21. In the example of FIG. 4 of course, an additional spring can also be provided for the displacement of the parts to the outside as it has been done in the embodiment according to FIG. 3. There the parts are displaced to the outside by the pressure spring 51. In the embodiment according to FIGS. 1 and 2 which further permits a change in the contact pressure linked with only minor change of the wiper arm spring 21, an additional pressure spring can be fitted for displacing the parts outwardly.

Figure 5:
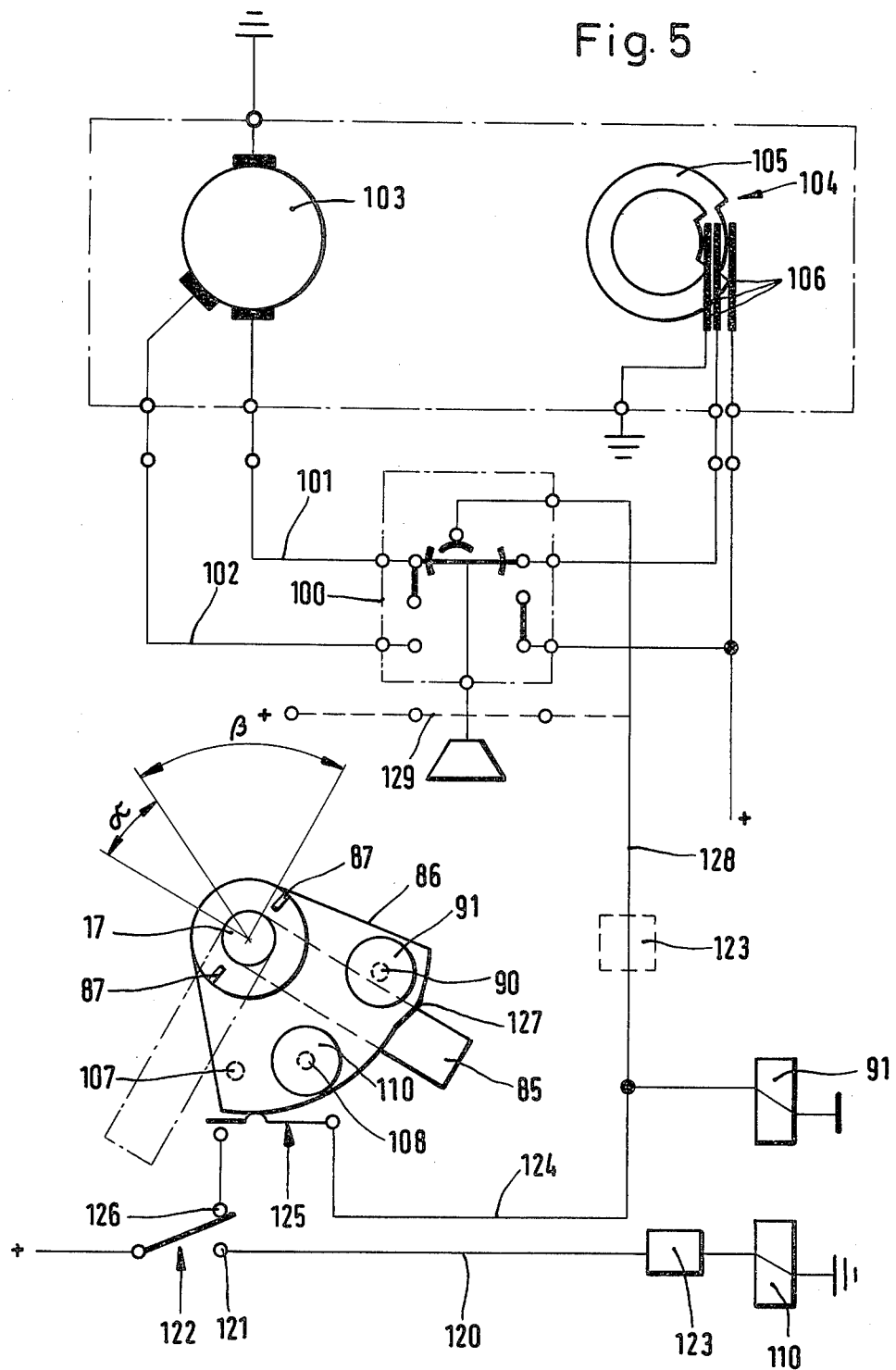
FIG. 5 is a circuit arrangement of a windshield wiper installation according to the invention with two stationary and two movable catches on the support.

FIG. 5 shows an electric circuit arrangement of a windshield wiper installation according to the invention. An electric motor 103 may be controlled with two speeds through an operating switch via to connection leads 101 and 102. A parking position switch 104 with a switching disk 105 and three sliding springs 106 are assigned to the electric motor 103. The middle sliding spring 106 is connected to an input of the operating switch 100 and via the switching disk 105 and the one or the other of the two outside sliding springs 106 is is either connected to the negative or to the positive pole of a voltage source. A second input of the operating switch is directly applied to positive potential. The operating switch can occupy a total of three different positions, namely an off-position, a first and a second operating position. In the off-position a bridging contact connects the first input with the lead 101, in the first operating position the second input with the lead 101 and in the second operating position the second input with the lead 102.

The part of the circuit arrangement which is needed to adjust the contact pressure is substantially shown in the lower half of the drawing of FIG. 5. There a wiper shaft 17 is driven by the electric motor 103 through the bearing crank 85 and on which the support 86 with the two guide studs 87 is rotatably mounted. In the windshield wiper installation according to FIG. 5 three different values of the contact pressure may be adjusted. For the displacement between the various values the support 86 is provided with a total of three catches 90, 107 and 108 at the same radial spacing to the wiper shaft 17. The two catches 90 and 108 can be moved into the path of the bearing crank and out of the path of the bearing crank by the electromagnets 91 and 110 in the way which has been described above in connection with FIG. 5. The catch 107 retains a firm position.

The windshield wiper installation shown in FIG. 5 is designed in such a way that the wiper blades are parked in a parking position which lies beyond the normal wiping angle $\beta$ by the amount of the angle $\alpha$. If the width of the bearing crank 85 is disregarded the angular distance between the catch 107 and the catch 90 corresponds to the wiping angle $\beta$. The catch 108 is positioned between the two catches 107 and 90. The catches 107 and 108 serve to increase the contact pressure, the catch 90 serves to diminish the contact pressure. Therefore the magnet 110 can be designated as an operating magnet, the magnet 91 as a release magnet. The magnet 110 is connected to an output 121 of a changeover switch 122 through a lead 120. The input of this changeover switch is applied to the positive pole of a voltage source. A timing element 123 is inserted in the lead 120. The magnet 91 is connected to the other output 126 of the changeover switch 122 by means of a lead 124 and a normally closed contact 125. The normally closed contact 125 is controlled by the rim 127 of the support 86 which rim is developed as a cam curve. The timing element 123 and the normally closed contact 125 have the same function. They have the purpose of interrupting the circuit of the electromagnet in question after a change-over of the support 86, so that each magnet is applied to voltage only for a short time. The use of by a normally closed contact and of a timing element offers indeed specific advantages, but in principle each timing element can be substituted for a normally closed contact and vice versa. In addition to the changeover switch 102 the release magnet 91 is connected to an additional input of the operating switch 100. In the off-position of the operating switch its bridging contact connects this additional input and the first input to which the middle sliding spring 106 is connected. As indicated by broken lines an additional briding contact 129 may be arranged in the operating switch such that, in the off-position of the operating switch, the release magnet 91 may directly via the briding contact be applied to the positive pole of the voltage source and by-pass the parking position switch 104. In this case a timing element 123 could be additionally inserted in the lead 128.

In FIG. 5 the various switches, the bearing crank 85 and the support 86 occupy positions which are realized, when the windshield wiper installation is switched off. When the operating switch 100 is then moved into the first or second operating position the bearing crank hits the catch 107 when its has been swiveled by the amount of an angle $\beta$ and rotates this catch in a clockwise direction by the amount of an angle $\alpha$. Thus, the normal operating value of the contact pressure is adjusted. During continued operation of the windshield wiper installation with this contact pressure the bearing crank moves between the two catches 107 and 90 within an angle $\beta$. In this case the catch 90 is drawn back. When the vehicle speed now exceeds a given value the make contact of the change over switch 122 is automatically or manually switched to the output 121. Thus the operating magnet 110 is controlled, so that the catch 108 jumps into the path of the bearng crank 85. When in this moment the bearing crank is positioned on the side of the catch 108 facing the catch 90 it hits the catch 108 within a short time and rotates the support 86 by a given angle. Thus, an increased contact pressure is adjusted. The contact 125 is closed by the cam 127. But this does not affect the release magnet 91, because the make contact of the changeover switch 122 is connected to the output 121. When the bearing crank moves on the side of the catch 108 facing the catch 107 at the time the catch 108 jumps into its path it presses the latter backwards against the force of the magnet by means of inclinations provided on the catch or on itself and adjusts the support 86 as late as it hits the catch 108 from the other side.

When the vehicle speed is reduced again, the make contact of the switch 122 changes over to the output 126. Thus the release magnet 91 becomes excited, because the normally closed contact 125 is closed. The catch 90 is extended, so that the bearing crank hits it at least when it advances to it from the catch 108. The support 86 is again brought into a position which corresponds to a normal contact pressure. The switch 125 opens again and disconnects the magnet 91 from the electric network. The switch can already be opened before the change-over is completed, because the bearing crank 85 presses so firmly against the catch 90 that this catch cannot be drawn back again before the motion of the bearing crank has been reversed.

When the windshield wiper installation is switched off at high or low vehicle speed the release magnet 91 is excited via the operating switch 100. The bearing crank 85 moves to a parking position lying outside the normal wiping angle and thereby takes along the support 86 via the catch 90. Thus a contact pressure value is adjusted which lies below the normal operating value at low speed. The magnet 91 is disconnected from the voltage supply by the timing element 123 or by the parking position switch 104.

When a high contact pressure is adjusted the catch 90 is positioned within the swiveling range of the bearing crank 85. When the windshield wiper installation is then switched off when the contact pressure is high it is possible that the contact pressure is not reduced, when the system is switched off at the time the bearing crank is positioned between the catch 90 and the parking position. This can be avoided by providing that at least one further wiping cycle is carried out after the wiper installation was switched off.

The windshield wiper installation can of course also be used when the parking position is not outside the normal wiping area but at its border. In this case one must only realize that the normal wiping angle is composed of the two angles α and β.

When, in contrast thereto, the parking position is outside of the normal wiping area by the amount of an angle α and only two different contact pressures are provided, namely a parking value and an operating value, the catch 108 with the magnet 110 and the manet 91 are no longer necessary. The catch 90 can have a firm, advanced position.

Figure 6:
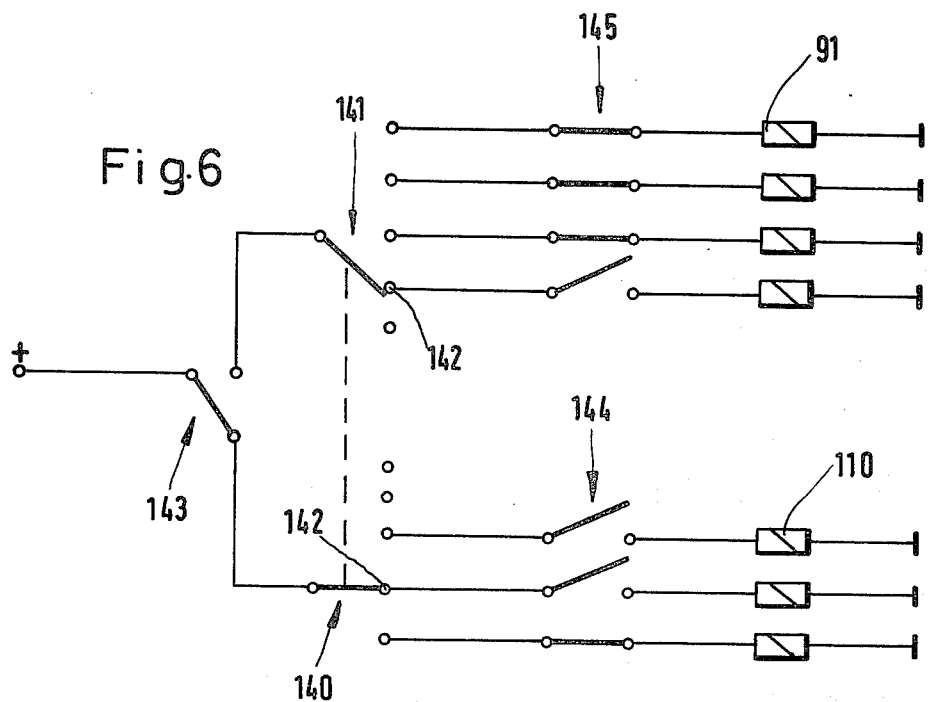
FIG. 6 is a circuit arrangement for the control of four electromagnets each for increasing and diminishing the contact pressure.
Figure 7:
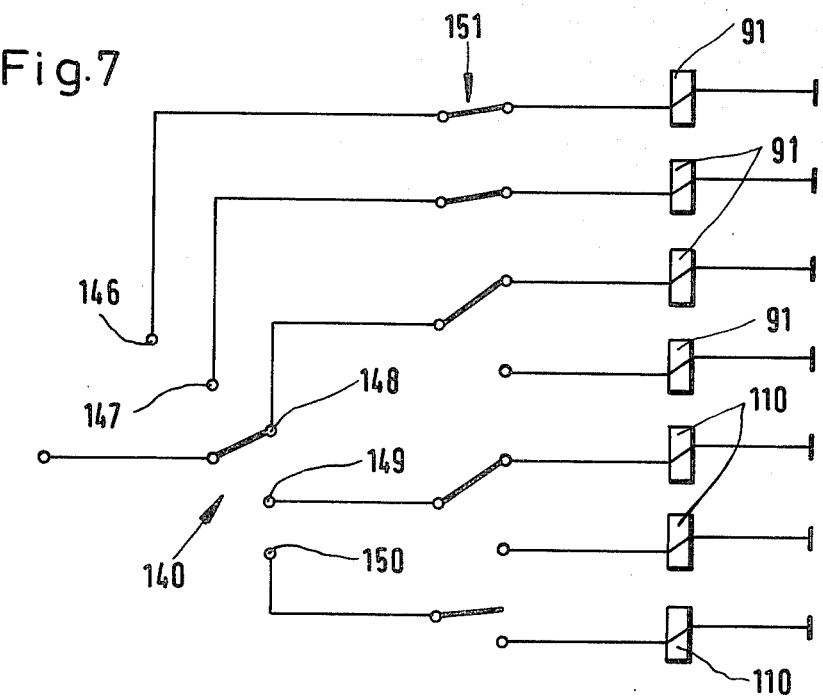
FIG. 7 is a circuit arrangement similar to that of FIG. 6 with modified switching means for the selection of the electromagnets.

In FIGS. 6 and 7 two circuit arrangements are shown which can be part of a windshield wiper installation which has more than three different contact pressures. In the examples shown there are five different values. Because the catch, which is necessary to change over the contact pressure from the lowest value to the next higher value, can again occupy a firm position, only three operating magnets 110, but four release magnets 91 are provided. In FIG. 6 a switch 140 is assigned to the operating magnets and a switch 141 to the release magnets 91.

The two switches 140 and 141 are coupled with each other and only jointly displaced in dependence on the vehicle speed. At a given contact pressure the make contacts of the switches 140 and 141 are at any time connected to that output assigned to the operating or release magnet which, when it is controlled, adjusts the contact pressure, from a higher or lower value. So for instance, the electromagnets effecting the second highest contact pressure, which in accordance with the positions of the make contacts of the switches 140 and 141 has been adjusted in the example of the drawings, are assigned to the fourth input 142 of these switches. The inputs of the switches 140 and 141 are connected to one output each of a changeover switch 143 whose input is applied to the positivve pole of the voltage source and which in dependence on a positive or negative change in the vehicle speed, occupies the one or other position. When the speed is constant or substantially constant the changeover switch 143 retains the position shown.

Between each of the electromagnets 110 and 91, respectively and the respective output at the switch 140 or 141 a normally closed contact 144 or 145 is inserted. The normally closed contacts 144 are controlled in such a way that those assigned to an electromagnet 110 effecting a higher contact pressure than that of the time being are closed, while all others are open. Vice versa all contacts 145 are closed which are assigned to an electromagnet 91 which effects a lower contact pressure than that of the time being. All other normally closed contacts 145 are open.

Thus the second highest contact pressure is adjusted at the time being. When the speed is now increased, the switch 143 retains its position, while the switches 140 and 141 are moved to the next stage. Thus the magnet 110 assigned to the highest contact pressure is connected to the positive pole of the voltage source and becomes excited. This changes the contact pressure to the highest value. During or upon termination of the adjusting action the last one of the normally closed contacts 144 is opened and thus the electromagnet is disconnected from the electric network. The last one of the normally closed contacts 145 is closed.

When the vehicle speed is reduced, the switch 143 changes over. The make contacts 140 and 141 are connected to the third output. Thus the corresponding electromagnet 91 can be excited. The contact pressure is reduced.

In the circuit arrangement according to FIG. 7 the two switches whose position depends on the vehicle speed are combined to a single switch 140 whose input is connected to the positive pole of a voltage source. To the two outputs 146 and 147 one release magnet 91 each is assigned, to the output 150 an operating magnet 110. From the outputs 148 and 149 one each of the operating magnets 110 or of the release magnets 91 may be controlled. There are normally closed contacts or changeover contacts 151 inserted between the outputs and the electromagnets which contacts connect the operating magnets 110 to the outputs of the switch 140 upon a positive change of the vehicle speed and the release magnets 91 upon a negative change of the vehicle speed. In the positions shown of the switch 140 and of the switches 151 a middle contact pressure value is adjusted and the vehicle speed is constant or diminishes. When it falls below a given threshold value the make contact of the switch 40 is connected to the output 147. By this measure the assigned release magnet 91 becomes excited and effects a reduction of the contact pressure. When the vehicle speed begins to increase, the switches 151 change over, so that now the operating magnets 110 may be controlled. Between the output 146 and the corresponding electromagnet 91 and between the output 150 and the corresponding electromagnet 110 also permanent electric connections can exist. By an additional timing element inserted before each of the electromagnets 91 and 110 it can be ensured, that the electromagnets are only controlled for a short time.

So that the switching means, whose position depends on the vehicle speed, do not change over continuously when this speed is slightly varied round a given value, the switching means have hysteresis.

What is claimed is:

1. A windshield wiper assembly comprising:
   a wiper bearing;
   a wiper shaft extending through said wiper bearing;
   a wiper arm;
   said wiper arm comprising: a wiper arm head having a fastening member mounted on said wiper shaft in a manner protected against twisting, said wiper arm head having a holding member supported on said wiper bearing;
   a swiveling member articulated on said fastening member;
   a wiper arm spring having one end acting on said swiveling member and its other end acting upon said holding member;
   said wiper shaft being movable in an axial direction relative to said bearing to displace said fastening member relative to said holding member to thereby vary the contact pressure exerted by said wiper spring.

2. A wiper assembly in accordance with claim 1 comprising:
   a movable bearing crank coupled to said wiper shaft; and
   first and second guide elements twistable relative to each other by said crank;
   said first guide element being coupled with said wiper shaft in said axial direction, said other guide element being secured in said axial direction.

3. A wiper assembly in accordance with claim 2, wherein said first element has the same axis of rotation as said wiper shaft.

4. A wiper assembly in accordance with claim 3, wherein said second element comprises a plurality of guide cams; and said first element comprises a plurality of guide studs adapted to be displaced on said guide cams; said cams and said studs being arranged around said axis.

5. A wiper assembly in accordance with claim 4 comprising a support carrying said plurality of first element; and coupling means for coupling said support and said bearing crank such that said support means may be disengaged and said wiper shaft may be secured in various axial positions.

6. A wiper assembly in accordance with claim 5, couples said bearing crank and said support with dead travel.

7. A wiper assembly in accordance with claim 6, wherein said wiper arm may be swiveled into a parking position which lies outside the normal wiping angle and that said dead travel corresponds to the normal swiveling angle of said bearing crank.

8. A wiper assembly in accordance with claim 7, wherein said coupling means comprises catches arranged on said support.

9. A wiper assembly in accordance with claim 8, wherein said coupling means comprises a catch on said support which always retains its position and upon which said bearing crank acts with the first swivel from the parking position, and a further catch which may be moved into the path and out of the path of the bearing crank.

10. A wiper assembly in accordance with claim 9, wherein the spacing between said catch and said further catch is smaller than the normal swiveling angle of the bearing crank.

11. A wiper assembly in accordance with claim 8, wherein at least two of said catches may be moved into the path of said bearing crank and out of the path of said bearing crank said two catches having a spacing smaller than the normal swiveling angle of said bearing crank, and one of said two catches serves to effect the coupling when the contact pressure is increased and the other of said two catches serves to effect the coupling when the contact pressure is reduced.

12. A wiper assembly according to claim 9, wherein said wiper arm may be swiveled into a position which lies outside the normal wiping angle, said further catch being operably to diminish the contact pressure, and the spacing between said catch and said further catch is at least as large as the normal swiveling angle of said bearing crank.

13. A wiper assembly in accordance with claim 11, wherein said bearing crank may be coupled with one of said two catches only in one direction and with the other of said two catches only in the other direction.

14. A wiper assembly in accordance with claim 8, comprising an operating and a release electromagnet for each of said catches and one of said electromagnets may be excited with a positive change in the vehicle speed and the others with a negative change in the vehicle speed.

15. A wiper assembly in accordance with claim 14, comprising switching means responsive to vehicle speed for controlling a particular one of said operating and release electromagnet and responsive to whether the change in the vehicle speed is positive or negative for selecting the operating or the release electromagnet.

16. A wiper assembly in accordance with claim 15, wherein only one operating and one release electromagnet are provided and that said switching means comprises a single changeover switch.

17. A wiper assembly in accordance with claims 14, 15 or 16, according to any one, wherein that at any time said electromagnets may only be controlled for a short time.

18. A wiper assembly in accordance with claim 17, comprising timing elements inserted in the control leads between said switching means and said electromagnets.

19. A wiper assembly in accordance with claim 17, wherein said switching means comprises normally closed contacts assigned to said electromagnets that upon displacement each normally closed contact interrupts the circuit of the assigned electromagnet which effects the displacement and that upon another displacement said contact is closed again.

20. A wiper assembly in accordance with claim 19, wherein said normally closed contacts assigned to the operating electromagnets are closed one after the other during a release action and said normally closed contacts assigned to the release electromagnets are closed one after the other during an operating action.

21. A wiper assembly in accordance with claim 19, wherein said normally closed contacts are controlled by second cams on said support.

22. A wiper assembly in accordance with claim 16, wherein said electromagnets may only be excited in particular swiveling ranges of said bearing crank which depend on the position of said support and on their position on said support.

23. A wiper assembly in accordance with claim 15, wherein the lowest contact pressure may be adjusted when an operating switch is moved into the off-position.

24. A wiper assembly in accordance with claim 23, comprising a parking position switch.

25. A wiper assembly in accordance with claim 23, wherein said operating switch comprises a bridging contact for applying operating voltage to one of said release electromagnets for effecting the return to the lowest contact pressure.

26. A wiper assembly in accordance with claim 1, wherein said holding member is arranged below said fastening member around said wiper shaft, said holding member being retained in position relative to said wiper bearing in the axial direction and being suitable relative to said wiper bearing.

27. A wiper assembly in accordance with claim 26, wherein said fastening member and said holding member are coupled with each other by catches in a manner protected against twisting, but axially displaceable relative to each other.

28. A wiper assembly in accordance with claims 26 or 27, wherein said holding member comprises a fork-shaped stud, said stud carrying a holding pin for suspending said wiper arm spring.

29. A wiper assembly in accordance with claim 28, wherein said stud is flanked by two cheeks of said fastening member, and said holding pin being only inserted in the stud of the holding member.

30. A wiper assembly in accordance with claim 28, wherein said fastening member includes an oblong hole and said holding pin projects into said oblong hold.

31. A wiper assembly in accordance with claim 26, wherein said holding member is secured in a form-fit manner in the axial direction.

32. A wiper assembly in accordance with claim 31, wherein said holding member is rotatable in a bearing bush firmly mounted in said wiper bearing.

33. A wiper assembly in accordance with claim 26, wherein said holding member is supported on said fastening member through a spring.

34. A wiper assembly in accordance with claim 33, wherein said spring is guided by said holding and fastening members.

35. A wiper assembly in accordance with claim 34, wherein said holding and fastening members have cup-shaped sections by which they are guided in each other.

36. A wiper assembly in accordance with claim 35 wherein said spring is disposed within said cup-shaped sections and is supported on the bottom thereof.

37. A wiper assembly in accordance with claim 36 wherein said holding member and said fastening member are adapted to captively guide each other.

38. A wiper assembly in accordance with claim 37, wherein said fastening member has a stop against which the holding member may push to limit the displacement in the one direction and said holding member includes a clip to limit the displacement in the other direction.

39. A wiper assembly in accordance with claim 38, wherein said holding member has two sections positioned one behind the other with different dimensions transversally to the direction of mutual displacement, said fastening member extends at least partly over both of said two sections and including clip in the interspace between one of said two sections said clip acting as a stop.

40. A wiper assembly in accordance with claim 1, wherein said member includes a lever, swivelably mounted, and the position of which defines the position of the suspension point of said wiper arm spring said lever being coupled with a guide surrounding the wiper shaft, the position of said guide relative to said fastening member being variable in the axial direction.

41. A wiper assembly in accordance with claim 40, wherein said guide is rotatably mounted relative to said wiper bearing.

42. A wiper assembly in accordance with claim 41, comprising a thrust rolling bearing between said guide and said wiper bearing.

43. A wiper assembly in accordance with claim 42, wherein said lever is loaded by said wiper arm spring in a single swiveling direction and rests against said guide.

44. A wiper assembly in accordance with claim 40, wherein said lever is mounted on said fastening member opposite said wiper spring and said lever encompasses said wiper shaft.

45. A wiper assembly in accordance with claim 40, wherein said wiper arm spring is mounted on a second lever forming said holding member.

46. A wiper assembly in accordance with claim 45, wherein the suspension point of said wiper arm spring is positioned closer to said wiper shaft than the bearing axle of the second lever, said bearing axle being provided on extensions of said fastening member which project into said swiveling member.

47. A wiper assembly in accordance with claim 45 or 46, wherein said second lever is supported by said lever.

48. A wiper assembly in accordance with claim 47, wherein the point of support of said lever is positioned beyond the contact spots between said lever and said guide.

49. A wiper assembly in accordance with claim 48, wherein said suspension point of said wiper arm spring lies on the same side of a plane which is defined by the bearing axle of said holding member and by the suspension point of said wiper arm spring on said swiveling member.

50. A wiper assembly in accordance with claim 49, wherein said second lever forming is in the shape of a fork and that each wing of said fork is separately mounted.

* * * * *